(12) United States Patent
Hiwatashi

(10) Patent No.: US 11,678,060 B2
(45) Date of Patent: Jun. 13, 2023

(54) APPARATUS, METHOD FOR CONTROLLING APPARATUS, AND STORAGE MEDIUM

(71) Applicant: CANON KABUSHIKI KAISHA, Tokyo (JP)

(72) Inventor: Saku Hiwatashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/534,253

(22) Filed: Nov. 23, 2021

(65) Prior Publication Data

US 2022/0174201 A1 Jun. 2, 2022

(30) Foreign Application Priority Data

Nov. 30, 2020 (JP) .............................. JP2020-198252

(51) Int. Cl.
*H04N 23/72* (2023.01)
*G06T 7/215* (2017.01)

(52) U.S. Cl.
CPC ............ *H04N 23/72* (2023.01); *G06T 7/215* (2017.01)

(58) Field of Classification Search
CPC .... H04N 5/2352; H04N 5/2351; H04N 23/72; H04N 23/71; G06T 7/215
See application file for complete search history.

(56) References Cited

U.S. PATENT DOCUMENTS

| | | | | |
|---|---|---|---|---|
| 5,745,808 A * | 4/1998 | Tintera | ................. | H04N 5/2353 348/E5.037 |
| 2007/0206941 A1 * | 9/2007 | Maruyama | ............... | G03B 5/00 396/153 |
| 2010/0045798 A1 * | 2/2010 | Sugimoto | .............. | H04N 5/144 348/222.1 |
| 2015/0016683 A1 * | 1/2015 | Kinoshita | .......... | H04N 5/23219 382/103 |
| 2015/0350508 A1 * | 12/2015 | Song | .................... | H04N 9/0451 348/222.1 |
| 2016/0094825 A1 * | 3/2016 | Lu | .......................... | H04N 5/235 348/223.1 |
| 2017/0212408 A1 * | 7/2017 | Ma | ...................... | H04N 5/23296 |
| 2017/0214838 A1 * | 7/2017 | Miyazawa | ........... | H04N 5/2352 |
| 2017/0324911 A1 * | 11/2017 | Miyakawa | ........... | H04N 5/3535 |
| 2018/0012374 A1 * | 1/2018 | Fujita | ................... | H04N 5/2257 |
| 2018/0220054 A1 * | 8/2018 | Swami | ................... | G06T 5/009 |
| 2020/0348580 A1 * | 11/2020 | Pan | ...................... | H04N 5/2351 |

FOREIGN PATENT DOCUMENTS

| | | |
|---|---|---|
| JP | 2010136205 A | 6/2010 |
| JP | 2011004089 A | 1/2011 |

* cited by examiner

*Primary Examiner* — Jason A Flohre

(74) *Attorney, Agent, or Firm* — Canon U.S.A., Inc. IP Division

(57) ABSTRACT

An apparatus configured to divide a captured image into a plurality of regions and carry out imaging under a different exposure condition for each of the regions, includes an acquisition unit configured to acquire an exposure value for each of the regions in the captured image, a detection unit configured to detect a motion region based on the captured image, and a determination unit configured to determine an exposure time and a gain based on the exposure value for each of the regions and a result of detection of the motion region, wherein the determination unit sets a limitation on an adjustment range of at least any of the exposure time and the gain based on the result.

16 Claims, 16 Drawing Sheets

FIG.3

| EXPOSURE VALUE (EV) | EXPOSURE TIME (1/s) | GAIN (x) | APERTURE (F) |
|---|---|---|---|
| 1 | 30 | 8 | 22 |
| 2 | 60 | 8 | 22 |
| 3 | 120 | 8 | 22 |
| 4 | 240 | 8 | 22 |
| 5 | 480 | 8 | 22 |
| 6 | 960 | 8 | 22 |
| 7 | 1920 | 8 | 22 |
| ... | ... | ... | ... |
| EV max | 16000 | 1 | 2 |

FIG.15

|  |  | EXPOSURE CONDITIONS A 1401 | | EXPOSURE CONDITIONS B 1402 | | EXPOSURE CONDITIONS C 1403 | |
|---|---|---|---|---|---|---|---|
|  |  | EXPOSURE TIME (1/s) | GAIN | EXPOSURE TIME (1/s) | GAIN | EXPOSURE TIME (1/s) | GAIN |
| EXPOSURE VALUE | 1 | 250 | 64 | 60 | 16 | 30 | 8 |
| | 2 | 250 | 32 | 120 | 16 | 30 | 4 |
| | 3 | 250 | 16 | 120 | 8 | 30 | 2 |
| | 4 | 250 | 8 | 250 | 8 | 30 | 1 |
| | 5 | 250 | 4 | 250 | 4 | 250 | 4 |
| | 6 | 250 | 2 | 250 | 2 | 250 | 2 |
| | 7 | 250 | 1 | 250 | 1 | 250 | 1 |
| | 8 | 2000 | 4 | 2000 | 4 | 2000 | 4 |
| | 9 | 2000 | 2 | 2000 | 2 | 2000 | 2 |
| | 10 | 2000 | 1 | 2000 | 1 | 2000 | 1 |
| | 11 | 16000 | 4 | 16000 | 4 | 16000 | 4 |
| | 12 | 16000 | 2 | 16000 | 2 | 16000 | 2 |
| | 13 | 16000 | 1 | 16000 | 1 | 16000 | 1 |

APPARATUS, METHOD FOR CONTROLLING APPARATUS, AND STORAGE MEDIUM

BACKGROUND OF THE DISCLOSURE

Field of the Disclosure

The aspect of the embodiments relates to an imaging apparatus, a technique for controlling the imaging apparatus, and a storage medium.

Description of the Related Art

Generally, the dynamic range of an image sensor such as a charge-coupled device (CCD) and a complementary metal-oxide semiconductor (CMOS) used in an imaging apparatus such as a digital camera and a digital video camera is narrow compared to the dynamic range in the natural world. Thus, if an imaging scene having a wide dynamic range (referred to as a high dynamic range, and hereinafter will be abbreviated as an HDR) is imaged by a normal method, for example, what is called an underexposure or overexposure occurs. Thus, there is a technique that captures the HDR scene using a sensor capable of controlling exposure conditions such as an accumulation time (an exposure time) and a gain at the time of a readout (hereinafter abbreviated as a gain) for each region based on preliminary imaging, as in Japanese Patent Application Laid-Open No. 2010-136205. Further, Japanese Patent Application Laid-Open No. 2011-4089 discusses a technique that carries out imaging after changing exposure conditions at a boundary portion of the exposure conditions to darker exposure conditions from among exposure conditions around when optimum exposure conditions are determined for each region based on preliminary imaging. According to the technique discussed in Japanese Patent Application Laid-Open No. 2011-4089, in a case where misalignment occurs at the boundary portion due to a time lag between the preliminary imaging and main imaging, an overexposure generated at the boundary portion can be reduced.

However, in a case where the exposure conditions for a region is changed to the darker exposure conditions than exposure conditions around and the gain is increased for the region imaged under the exposure conditions, noise in the image increases. An increase in noise in this manner leads to a reduction in time correlation, thereby leading to a reduction in a compression ratio, for example, when the image data is compressed. Then, the reduction in the compression ratio leads to, for example, an increase in traffic at the time of a data transfer and an increase in a storage capacity required to accumulate data.

Further, for example, when a subject moves in a dark region where the exposure time is likely to increase, a motion blur easily occurs due to the increased exposure time. An occurrence of a motion blur in this manner leads to a reduction in visibility of the captured subject image, thereby leading to a reduction in a recognition rate of the subject, for example, when image recognition processing is performed.

SUMMARY OF THE DISCLOSURE

According to an aspect of the embodiments, an apparatus configured to divide a captured image into a plurality of regions and carry out imaging under a different exposure condition for each of the regions includes an acquisition unit configured to acquire an exposure value for each of the regions in the captured image, a detection unit configured to detect a motion region based on the captured image, and a determination unit configured to determine an exposure time and a gain based on the exposure value for each of the regions and a result of detection of the motion region, wherein the determination unit sets a limitation on an adjustment range of at least any of the exposure time and the gain based on the result.

Further features of the disclosure will become apparent from the following description of exemplary embodiments with reference to the attached drawings.

BRIEF DESCRIPTION OF THE DRAWINGS

FIG. 3 is a table illustrating an example of a corresponding relationship between an exposure value and exposure conditions.

FIG. 15 is a diagram illustrating an example of an exposure condition table.

DESCRIPTION OF THE EMBODIMENTS

Figure 1:
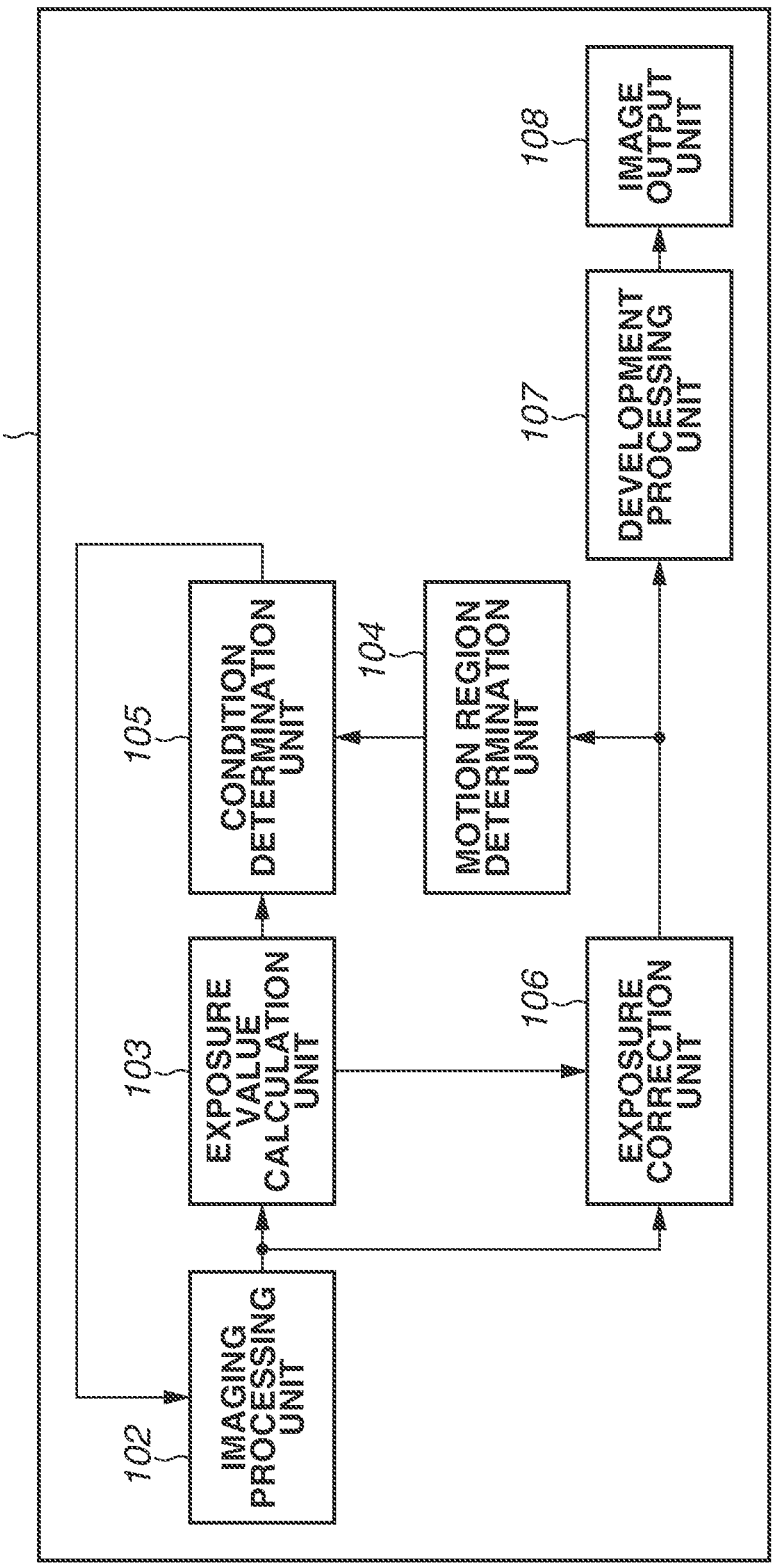
FIG. 1 is a diagram illustrating an example of a configuration of an imaging apparatus according to a first exemplary embodiment.

In the following description, exemplary embodiments of the disclosure will be described in detail with reference to the accompanying drawings. Configurations that will be described in the present exemplary embodiments are merely examples, and the disclosure shall not be limited to the illustrated configurations.

The present exemplary embodiments will be described by assigning the same reference numerals to similar configurations or processing, and descriptions thereof will be omitted as appropriate.

First, an overview of control processing of each of imaging apparatuses according to the present exemplary embodiments will be described. In each of the present exemplary embodiments, an image sensor included in the imaging apparatus is a sensor to which a different exposure time and a different gain can be set region by region (including pixel by pixel). Hereinafter, the exposure time and the gain for each region will be referred to as region-by-region exposure conditions. Each of the imaging apparatuses according to the present exemplary embodiments carries out imaging using the image sensor with the region-by-region exposure conditions set thereto to acquire a captured image, and acquires a region in which an object is in motion (hereinafter referred to as a motion region) and a luminance distribution based on the captured image. Then, each of the imaging apparatuses according to the present exemplary embodiments determines the region-by-region exposure conditions for main imaging based on a result of detection of the motion region and the luminance distribution. It is possible to, for example, acquire an image with an expanded dynamic range by setting the exposure conditions for each region, capturing an image with the exposure amount changed for each region, and combining such images.

FIG. 1 is a block diagram illustrating an example of a configuration of an imaging apparatus 101 according to a first exemplary embodiment, which can capture an image under the region-by-region exposure conditions defined as described above.

In the imaging apparatus 101, an imaging processing unit 102 includes an optical system including a shutter, a lens, a diaphragm, an optical low-pass filter, and the like, and an image sensor capable of capturing a color image. The imaging processing unit 102 is configured to be able to change the exposure time and the gain for each region, i.e., set the region-by-region exposure conditions, and is configured to be able to acquire an image captured under the exposure conditions for each region. Then, the imaging processing unit 102 outputs digital image data (hereinafter simply referred to as a captured image) generated by digitally converting an image signal of a subject or the like that is acquired under the region-by-region exposure conditions.

An exposure value calculation unit 103 performs exposure value acquisition processing. The exposure value calculation unit 103 calculates an exposure value for each region (hereinafter referred to as a region-by-region exposure value) based on the captured image input from the imaging processing unit 102. Details of the region-by-region exposure value calculation processing by the exposure value calculation unit 103 will be described below.

A motion region determination unit 104 performs motion region detection processing. The motion region determination unit 104 accumulates previously captured images, and determines whether there is a motion in each region based on a plurality of captured images acquired at different imaging times. Details of the motion region detection processing (hereinafter referred to as motion region determination processing) by the motion region determination unit 104 will be described below.

A condition determination unit 105 performs region-by-region exposure condition determination processing. The condition determination unit 105 determines the exposure conditions for each region based on the region-by-region exposure value acquired from the exposure value calculation unit 103 and a result of the detection of the motion region for each region (information about whether there is a motion) that is acquired from the motion region determination unit 104.

Then, the condition determination unit 105 updates the settings of the imaging processing unit 102 based on the determined region-by-region exposure conditions. Details of the region-by-region exposure condition determination processing by the condition determination unit 105 will be described below.

An exposure correction unit 106 performs exposure amount correction processing. The exposure correction unit 106 corrects a difference in the exposure amount for each region in the captured image based on the region-by-region exposure value calculated by the exposure value calculation unit 103. The captured image in which the difference in the exposure amount for each region is corrected by the exposure correction unit 106 is transmitted to a development processing unit 107 as a captured image acquired through the main imaging (a main image). Details of the region-by-region exposure amount correction processing by the exposure correction unit 106 will be described below.

The development processing unit 107 performs development processing such as white balance processing, debayer processing, noise reduction processing, sharpness processing, and gamma correction processing on the captured image in which the difference in the exposure amount for each region has been corrected by the exposure correction unit 106.

An image output unit 108 outputs image data on which the development processing has been performed by the development processing unit 107 to a printer, a display, or a storage medium such as a memory card via a cable, wireless communication, or the like.

<Overall Processing of Imaging Apparatus>

Figure 2:
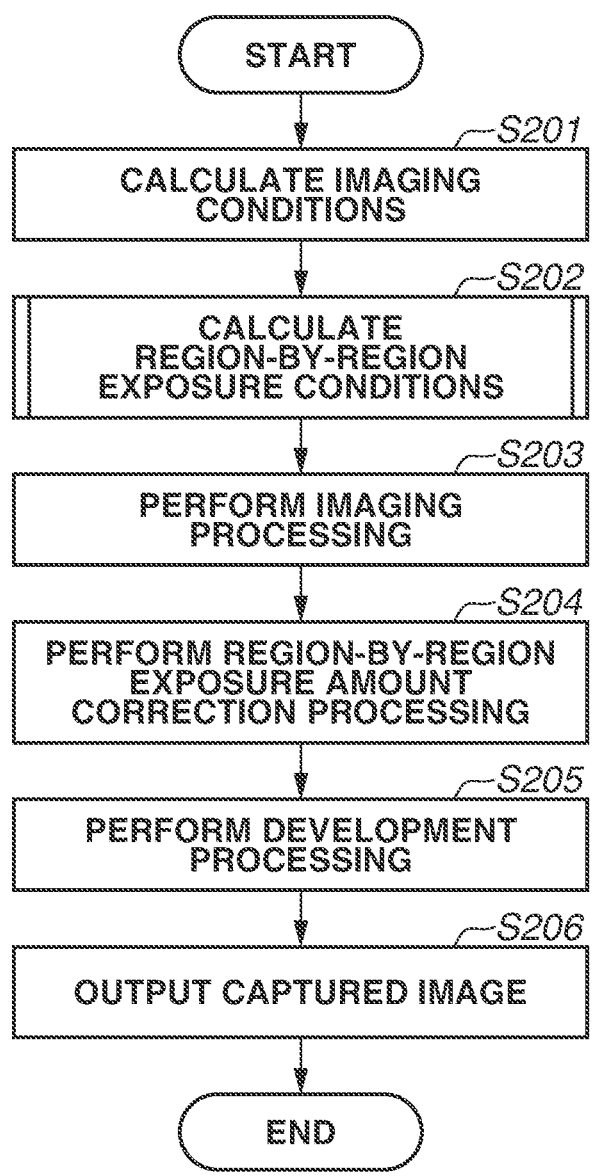
FIG. 2 is a flowchart illustrating overall processing of the imaging apparatus.

FIG. 2 is a flowchart illustrating overall processing procedures from determination of imaging conditions to output of the captured image acquired through the main imaging in the imaging apparatus 101 according to the present exemplary embodiment.

In step S201, the condition determination unit 105 sets the imaging conditions such as an aperture value and an exposure value serving as a reference for the entire image, and sets the imaging conditions to the imaging processing unit 102.

Next, in step S202, the exposure value calculation unit 103 calculates the exposure value for each region (the region-by-region exposure value), and the condition determination unit 105 determines the region-by-region exposure conditions. Details of the region-by-region exposure value calculation processing and the region-by-region exposure condition determination processing in step S202 will be described below.

Then, in step S203, the imaging processing unit 102 performs imaging processing to acquire the captured image based on the imaging conditions calculated in step S201 and the region-by-region exposure conditions set in step S202.

Then, in step S204, the exposure correction unit 106 performs the exposure amount correction processing for each region on the captured image acquired using the exposure conditions different for each region in step S203. At this time, the region-by-region exposure amount correction processing by the exposure correction unit 106 is expressed by, for example, the following equation (1).

$$C' = ai \cdot C \quad (1)$$
$$(C = R, G, B)$$
$$ai = 2.0^{\wedge}(EVi - EVbase)$$

In the equation (1), C represents any color of red (R), green (G), and blue (B), which are the three primary colors, ai represents a correction value of the exposure amount in a region i, EVi represents the exposure value in the region i, and EVbase represents an exposure value serving as a reference. For example, an average value of exposure values of the regions is used as EVbase. The exposure value is an index indicating brightness among the imaging conditions that correspond to the exposure time, the gain, and the aperture value as in the example illustrated in FIG. 3, and is expressed by a power of 2.

Then, in step S205, the development processing unit 107 performs the development processing on the image on which the region-by-region exposure amount correction processing has been performed in step S204.

Then, in step S206, the image output unit 108 outputs the image on which the development processing has been performed.

<Region-by-Region Exposure Value Calculation Processing>

Figure 4:
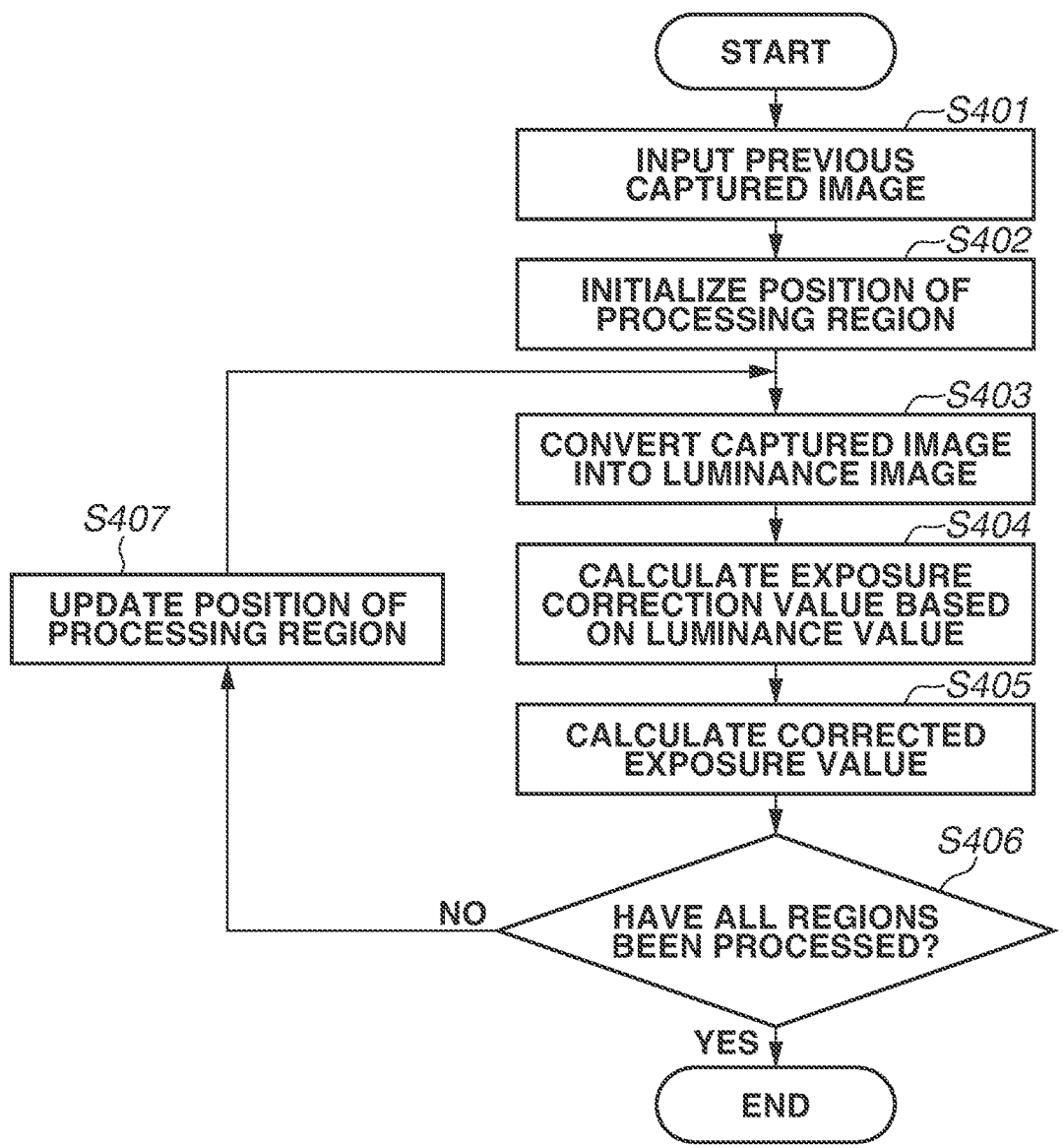
FIG. 4 is a flowchart illustrating region-by-region exposure value calculation processing.

FIG. 4 is a detailed flowchart illustrating the region-by-region exposure value calculation processing performed when the region-by-region exposure conditions are determined in step S202 in FIG. 2.

In step S401, the exposure value calculation unit 103 acquires a previously captured image. The previously captured image is, for example, a captured image imaged one frame before the main imaging.

Next, in step S402, the exposure value calculation unit 103 initializes a position of a processing region regarding the region-by-region exposure value calculation processing. The processing region may have any size as long as it is sized to allow the exposure conditions to be controlled. For example, the processing region may be formed of one pixel or may be formed of a plurality of pixels. In the present exemplary embodiment, the image is divided into regions each formed of 128×128 pixels, and the region serves as the processing region.

Next, in step S403, the exposure value calculation unit 103 converts the input captured image into a luminance image in which each pixel has a luminance value. Any method may be used as the method for converting the captured image into the luminance image as long as a pixel value in the processing region can be converted into a luminance value. For example, in a case where the captured image has an RGB Bayer structure, the pixel value can be converted into a luminance value Y common among 2×2 pixels using, for example, the following equation (2).

$$Y = 0.2126 \times R + 0.7152 \times G + 0.0722 \times B \quad (2)$$

Next, in step S404, the exposure value calculation unit 103 calculates an exposure correction value (referred to as an EV correction value) for each region based on the luminance value in the luminance image calculated in step S403. Here, the exposure correction value (EV correction value) refers to a value indicating how much the reference exposure value is to be changed to reach optimum conditions for each region. For example, in a case where Ymax represents a maximum luminance value in the region and max represents a maximum luminance value possible in the image, the EV correction value is expressed by the following equation (3).

$$\text{if}(Y\text{max} == \text{max}) \quad (3)$$
$$EV \text{ correction value} = -1$$
$$\text{else}$$
$$EV \text{ correction value} = \log2(\text{max}/Y\text{max})$$

Then, in step S405, the exposure value calculation unit 103 calculates the exposure value that has been corrected using the exposure correction value (EV correction value) calculated in step S404. The corrected exposure value (EV) can be calculated by the following equation (4).

$$EV + EVbase + EV \text{ correction value} \quad (4)$$
$$\text{if}(EV < 1)$$
$$EV = 1$$
$$\text{else if}(EV > EV\text{max})$$
$$EV = EV\text{max}$$

In the equation (4), EVbase represents the exposure value serving as the reference as in the example illustrated in FIG. 3, and EVmax represents an exposure value corresponding to imaging conditions that allow the darkest possible setting among set aperture values.

In step S406, the exposure value calculation unit 103 determines whether the processing has been performed on all of the regions. Then, if the exposure value calculation unit 103 determines that the processing has been performed on all of the regions (YES in step S406), the region-by-region exposure value calculation processing illustrated in FIG. 4 is ended. If not (NO in step S406), the region-by-region exposure value calculation processing illustrated in FIG. 4 proceeds to the processing of step S407.

In step S407, the exposure value calculation unit 103 updates the position of the processing region. Subsequently, the region-by-region exposure value calculation processing returns to step S403 and repeats the processing from step S403 to step S406.

<Motion Region Determination Processing>

Figure 5:
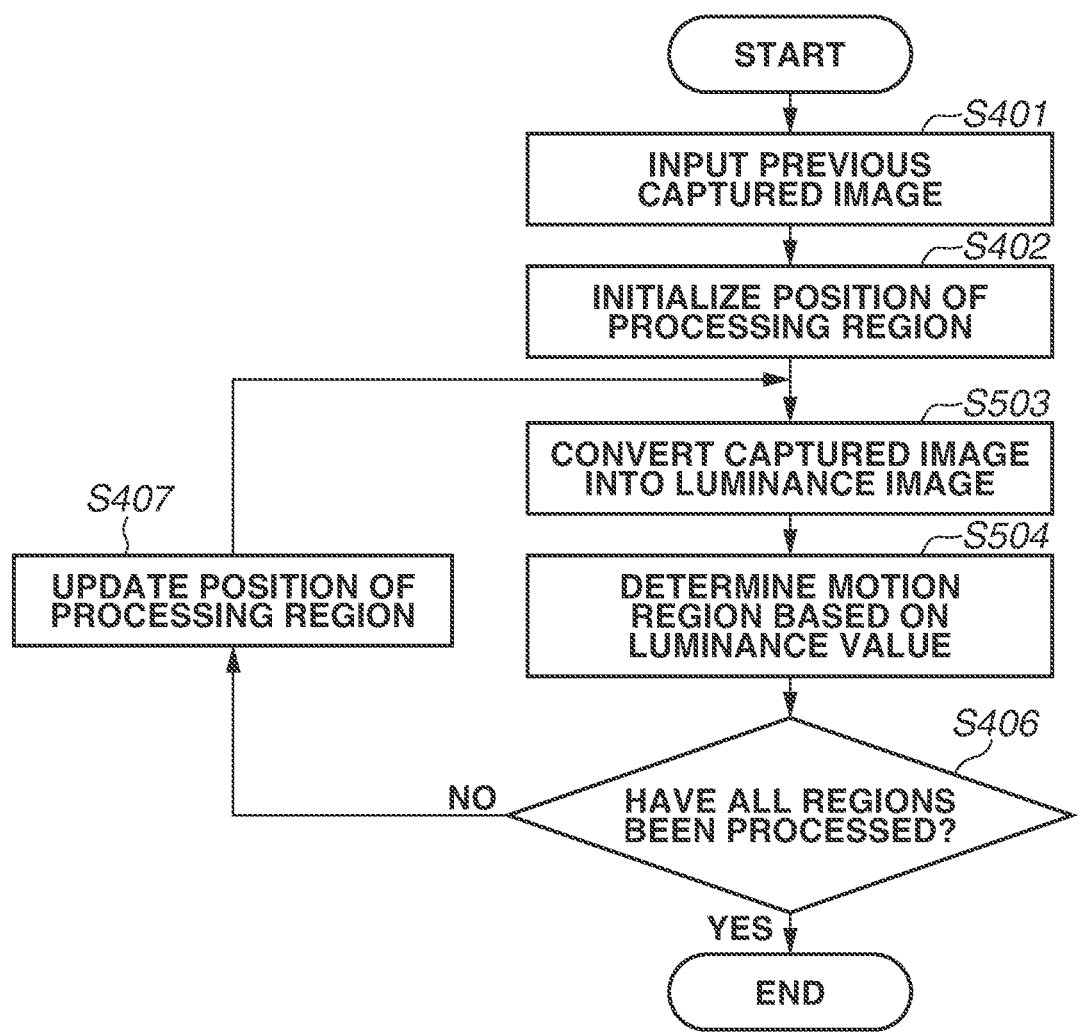
FIG. 5 is a flowchart illustrating motion region determination processing.

FIG. 5 is a flowchart illustrating the details of the motion region determination processing by the motion region determination unit 104 in FIG. 1. The processing procedures of steps S401, S402, S406, and S407 in FIG. 5 are similar to the respective processing procedures indicated by the same reference numerals in FIG. 4 except that the processing procedures are performed by the motion region determination unit 104. Thus, descriptions thereof will be omitted herein. The motion region determination unit 104 uses two captured images acquired at different imaging times (a captured image (t) and a captured image (t+1)) to determine the motion region. In other words, in the case of FIG. 5, in step S401, the captured image (t) is acquired as the image previous to the captured image (t+1). Next, after the processing region position initialization processing is performed in step S402, the motion region determination unit 104 performs the processing of step S503.

In step S503, the motion region determination unit 104 converts the captured image into the luminance image.

The processing for converting the captured image into the luminance image is similar to the luminance conversion processing performed in step S403 in the region-by-region exposure value calculation processing in FIG. 4, and thus a description thereof will be omitted herein.

Next, in step S504, the motion region determination unit 104 determines the motion region using the luminance image converted in step S503.

Figure 6:
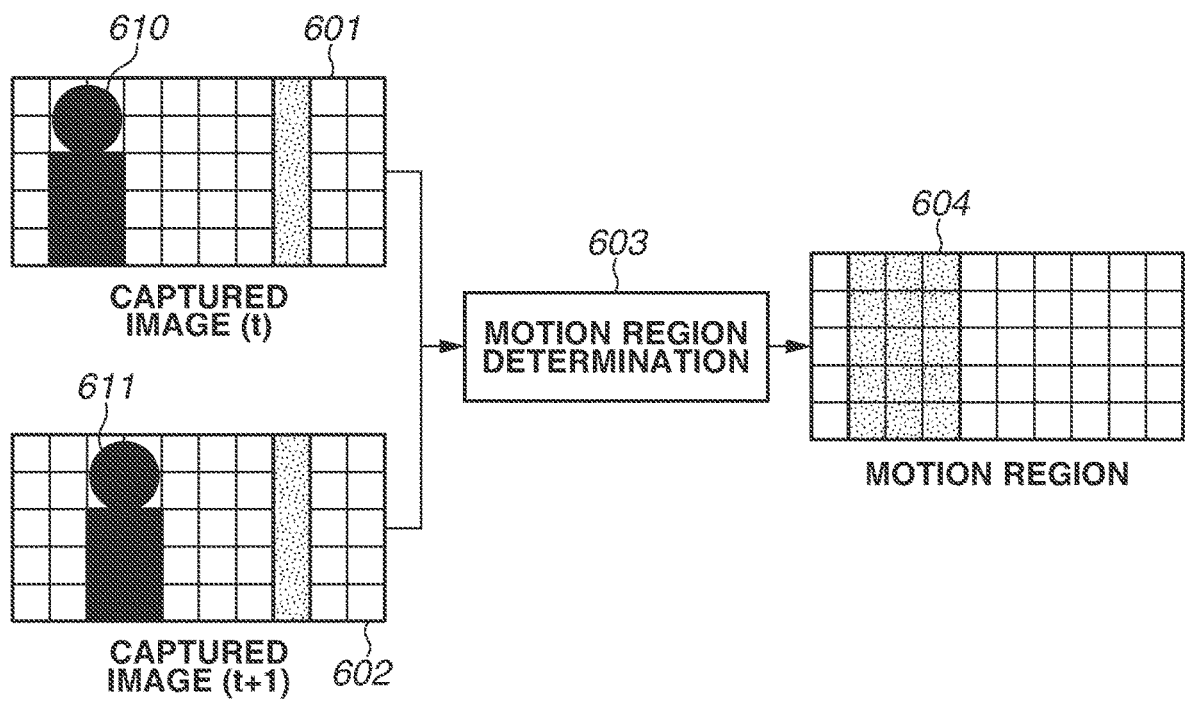
FIG. 6 is a diagram used in a description of the motion region determination processing.

FIG. 6 is a diagram used in the description of an outline of the motion region determination processing by the motion region determination unit 104. As illustrated in FIG. 6, a luminance image 601, which results from the luminance conversion of the captured image (t), and a luminance image 602, which results from the luminance conversion of the captured image (t+1), are input to the motion region determination unit 104. Individual cells in the luminance image 601 and the luminance image 602 each indicate the processing region. The motion region determination unit 104 detects a motion region 604 by performing motion region determination processing 603 based on a luminance difference for each region using the luminance images 601 and 602. In the example of the luminance image 601 and the luminance image 602 illustrated in FIG. 6, a luminance difference is present in a human region 610 and a human region 611, and thus these regions containing the luminance difference are detected as the motion region 604. Any method may be employed as the method for determining the motion region as long as the employed method can determine whether there is a motion for each region. For example, a motion Mi can be calculated by summing absolute differences of the luminance values in the region i, performing gain processing thereon, and then performing threshold value processing thereon, as indicated by an equation (5).

$$Mi = g \times \left( \sum |Yt, i(j) - Yt+1, i(j)| - Th \right) \quad (5)$$

In the equation (5), Yt,i represents the luminance value in the region i in the luminance image of the captured image (t), Yt+1,i represents the luminance value in the region i in the luminance image of the captured image (t+1), j represents the pixel position, g represents the gain, and Th represents the threshold value. The gain g and the threshold value Th are parameters for adjusting an error in a calculated region. By adjusting the gain g, the imaging apparatus 101 can control a motion region intensity. Further, by controlling the threshold value Th of the absolute difference for determining the motion region, the imaging apparatus 101 can control how large the luminance difference should be to determine a region as the motion region.

<Exposure Condition Determination Processing>

Next, the details of the exposure condition determination processing by the condition determination unit 105 will be described. The condition determination unit 105 determines the exposure conditions based on the result of the detection of the motion region for each region that is acquired by the motion region determination unit 104 (hereinafter referred to as a motion region map) and the exposure value for each region that is calculated by the exposure value calculation unit 103 (hereinafter referred to as an exposure value map).

Figure 7:
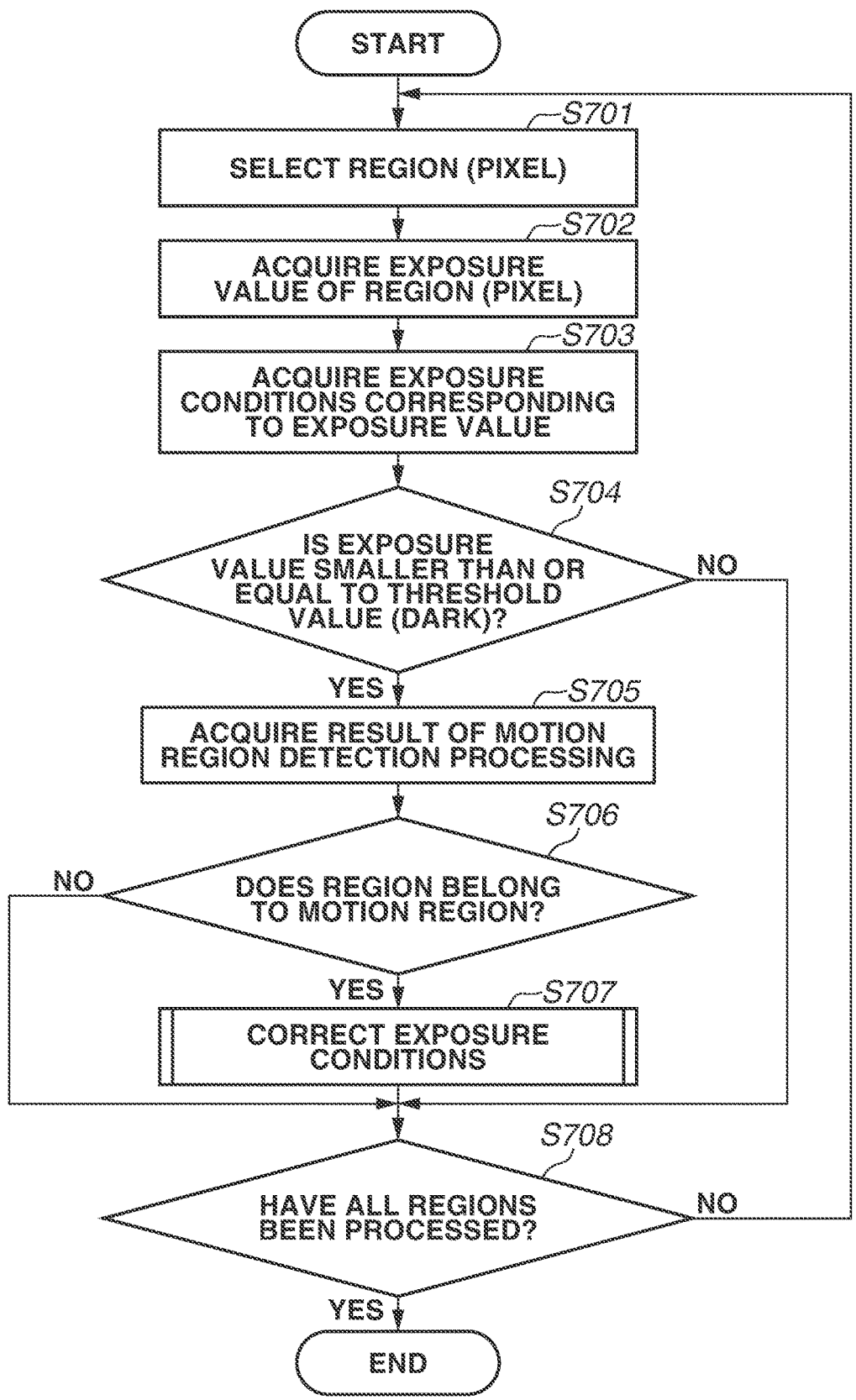
FIG. 7 is a flowchart illustrating exposure condition determination processing according to the first exemplary embodiment.

FIG. 7 is a detailed flowchart illustrating the exposure condition determination processing by the condition determination unit 105.

In step S701, the condition determination unit 105 selects the processing region.

Next, in step S702, the condition determination unit 105 acquires the exposure value of the processing region by referring to the exposure value map.

Then, in step S703, the condition determination unit 105 acquires standard exposure conditions corresponding to the exposure value of the processing region.

Then, in step S704, the condition determination unit 105 compares the exposure value of the processing region with an appropriate reference value (threshold value), thereby determining whether the processing region is a target of the processing, i.e., determining whether the processing region is a dark region in which the exposure value is lower than or equal to the threshold value. If the condition determination unit 105 determines that the processing region is a processing target (determines that the exposure value is smaller than or equal to the threshold value) as a result of the determination (YES in step S704), the exposure condition determination processing proceeds to the processing of step S705. On the other hand, if the condition determination unit 105 determines that the processing region is not a processing target (determines that the exposure value is not smaller than or equal to the threshold value) (NO in step S704), the exposure condition determination processing proceeds to the processing of step S708. If the exposure condition determination processing proceeds to the processing of step S708, the processing for correcting the exposure conditions is not performed with respect to the processing region.

In step S705, the condition determination unit 105 acquires a result of the motion region detection processing on the processing region by referring to the motion region map.

Next, in step S706, the condition determination unit 105 determines whether the processing region belongs to a motion region. If the processing region belongs to a motion region (YES in step S706), the processing proceeds to step S707. If the processing region does not belong to a motion region (NO in step S706), the processing proceeds to step S708.

If the processing proceeds to step S707, the condition determination unit 105 performs exposure condition correction processing. Details of the exposure condition correction processing in step S707 will be described below.

On the other hand, if the processing proceeds to step S708, the condition determination unit 105 determines whether all of the regions have been processed. Then, if the condition determination unit 105 determines that all of the regions have been processed (YES in step S708), the processing according to the flowchart in FIG. 7 is ended. If not (NO in step S708), the processing returns to step S701.

<Exposure Condition Correction Processing>

The exposure condition correction processing performed in step S707 in FIG. 7 will be described below.

In the exposure condition correction processing in step S707, the condition determination unit 105 corrects the exposure conditions based on an externally set limitation on the exposure conditions. In the present exemplary embodiment, a limitation is set on adjustment ranges of the exposure time and the gain as the limitation on the exposure conditions. In the present exemplary embodiment, an upper limit value is set on the adjustment range of the exposure time as a limitation on the exposure time, and an upper limit value is set on the adjustment range of the gain as a limitation on the gain. Setting the upper limit value on the adjustment range of the exposure time in this manner allows the imaging apparatus 101 to prevent or reduce an occurrence of a motion blur in the motion region, thereby improving visibility. Further, setting the upper limit value on the adjustment range of the gain allows the imaging apparatus 101 to prevent or reduce the occurrence of noise, thereby improving a compression ratio of an image.

Now, a relationship between the exposure value and the exposure conditions will be described.

Figure 8:
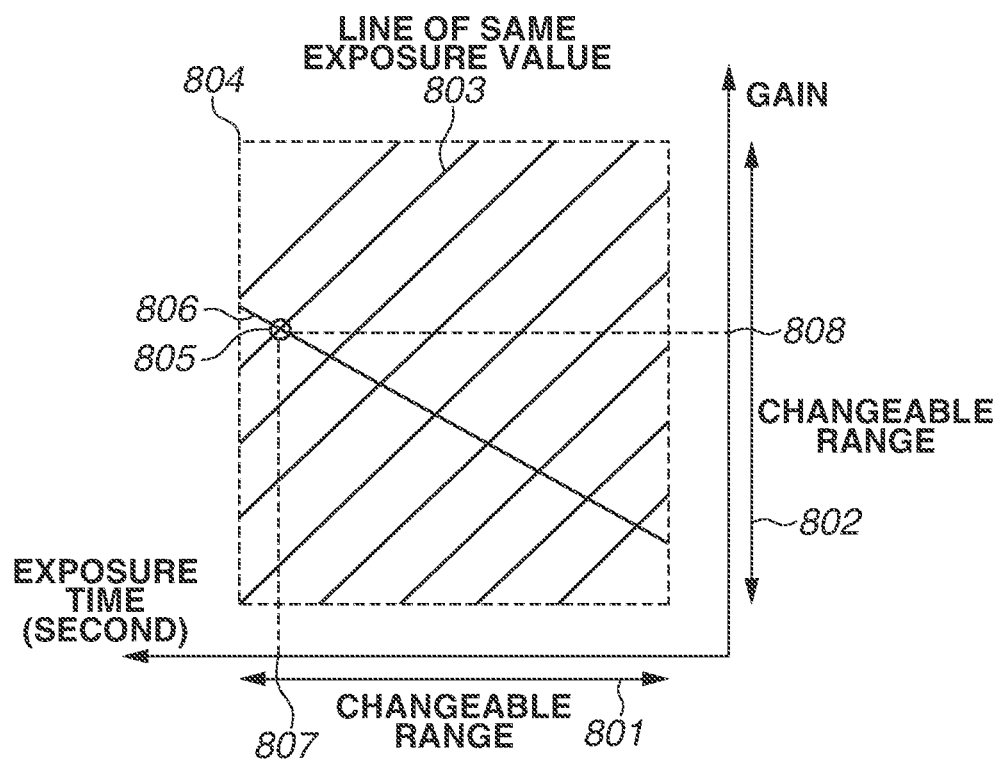
FIG. 8 is a diagram used in a description of exposure condition correction processing.

FIG. 8 is a line graph in which the horizontal axis represents the exposure time and the vertical axis represents the value of the gain. A range 801 indicated by an arrow in FIG. 8 is a range in which the exposure time is changeable (referred to as an exposure time changeable range 801), and corresponds to the adjustment range of the exposure time. Similarly, a range 802 indicated by an arrow is a range in which the value of the gain is changeable (referred to as a gain changeable range 802), and corresponds to the adjustment range of the value of the gain. Further, a region 804 indicates a region in which the exposure time and the value of the gain are changeable. A line 803 is a line indicating a relationship between the exposure time and the value of the gain corresponding to the same exposure value. In other words, as long as the position of an intersection point at which the exposure time and the value of the gain intersect with each other is on the line graph (on the line 803), the exposure value is the same value regardless of what kind of combination is formed as the combination of the exposure time and the value of the gain (the exposure conditions). On the other hand, a line 806 is a line defining the combination of the exposure time and the value of the gain (the exposure conditions) corresponding to the exposure value. In other words, in the region 804 in which the exposure time and the gain are changeable, exposure conditions 805 at an intersection point of the line 806 and the line 803 indicate the exposure conditions corresponding to this exposure value. In the example in FIG. 8, the exposure time and the gain corresponding to the exposure conditions 805 have a value 807 and a value 808, respectively.

Figure 9:
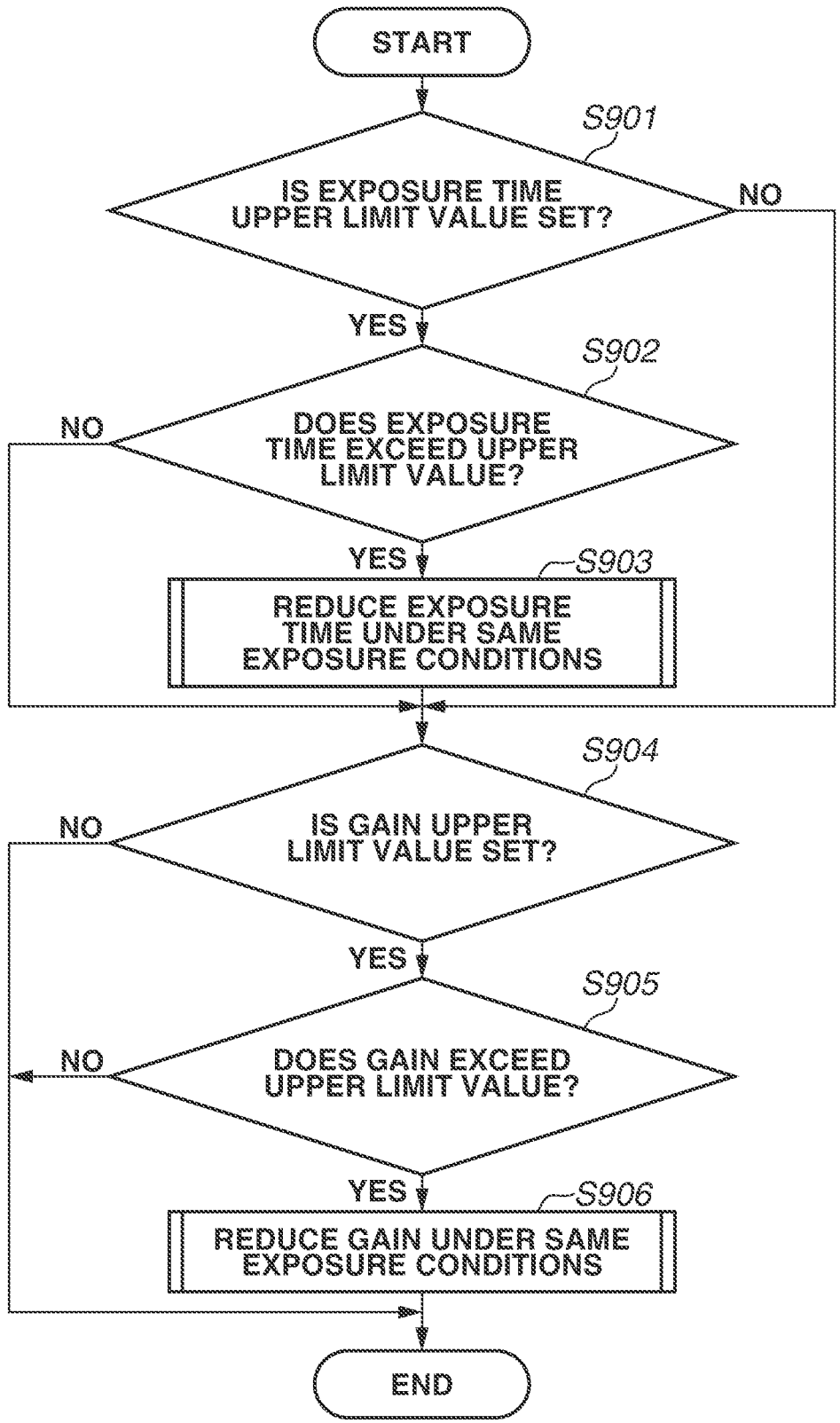
FIG. 9 is a flowchart illustrating the exposure condition correction processing.

FIG. 9 is a detailed flowchart illustrating the exposure condition correction processing in step S707 in FIG. 7.

In step S901, the condition determination unit 105 checks whether the upper limit value is set on the adjustment range of the exposure time (hereinafter referred to as an exposure time upper limit value). If the condition determination unit 105 determines that the exposure time upper limit value is set (YES in step S901), the exposure condition correction processing proceeds to the processing of step S902. If the condition determination unit 105 determines that the exposure time upper limit value is not set (NO in step S901), the exposure condition correction processing proceeds to the processing of step S904.

In step S902, the condition determination unit 105 compares the value of the exposure time acquired from the exposure value of the processing region with the exposure time upper limit value by referring to the line graph illustrated in FIG. 8. Then, if the condition determination unit 105 determines that the value of the exposure time exceeds the exposure time upper limit value (YES in step S902), the processing proceeds to step S903. On the other hand, if the condition determination unit 105 determines that the value of the exposure time is smaller than or equal to the exposure time upper limit value (NO in step S902), the processing proceeds to step S904.

In step S903, the condition determination unit 105 performs exposure time correction processing, thereby changing the exposure time to the upper limit value or smaller without changing the exposure value. In other words, the condition determination unit 105 performs such exposure time correction processing that the exposure time is reduced under the same exposure conditions. In other words, the condition determination unit 105 performs such exposure time correction processing that the exposure time is reduced while the position of the intersection point at which the exposure time and the value of the gain intersect with each other is prevented from deviating from the line graph (on the line 803). Details of the processing at this time will be described below.

Then, in step S904, the condition determination unit 105 checks whether the upper limit value is set on the adjustment range of the gain (hereinafter referred to as a gain upper limit value). If the condition determination unit 105 determines that the gain upper limit value is set (YES in step S904), the processing proceeds to step S905. If the condition determination unit 105 determines that the gain upper limit value is not set (NO in step S904), the processing according to the flowchart in FIG. 9 is ended.

In step S905, the condition determination unit 105 compares the value of the gain acquired from the exposure value of the processing region with the gain upper limit value by referring to the line graph illustrated in FIG. 8. Then, if the condition determination unit 105 determines that the value of the gain exceeds the gain upper limit value (YES in step S905), the processing proceeds to step S906. If the condition determination unit 105 determines that the value of the gain is smaller than or equal to the gain upper limit value (NO in step S905), the processing according to the flowchart in FIG. 9 is ended.

In step S906, the condition determination unit 105 performs gain correction processing, thereby changing the gain to the upper limit value or smaller without changing the exposure value. In other words, the condition determination unit 105 performs such gain correction processing that the gain is lowered under the same exposure conditions. In other words, the condition determination unit 105 performs such gain correction processing that the value of the gain is lowered while the position of the intersection point at which the exposure time and the value of the gain intersect with each other is prevented from deviating from the line graph (on the line 803). Details of the processing at this time will be described below.

<Exposure Time Correction Processing>

Figure 10:
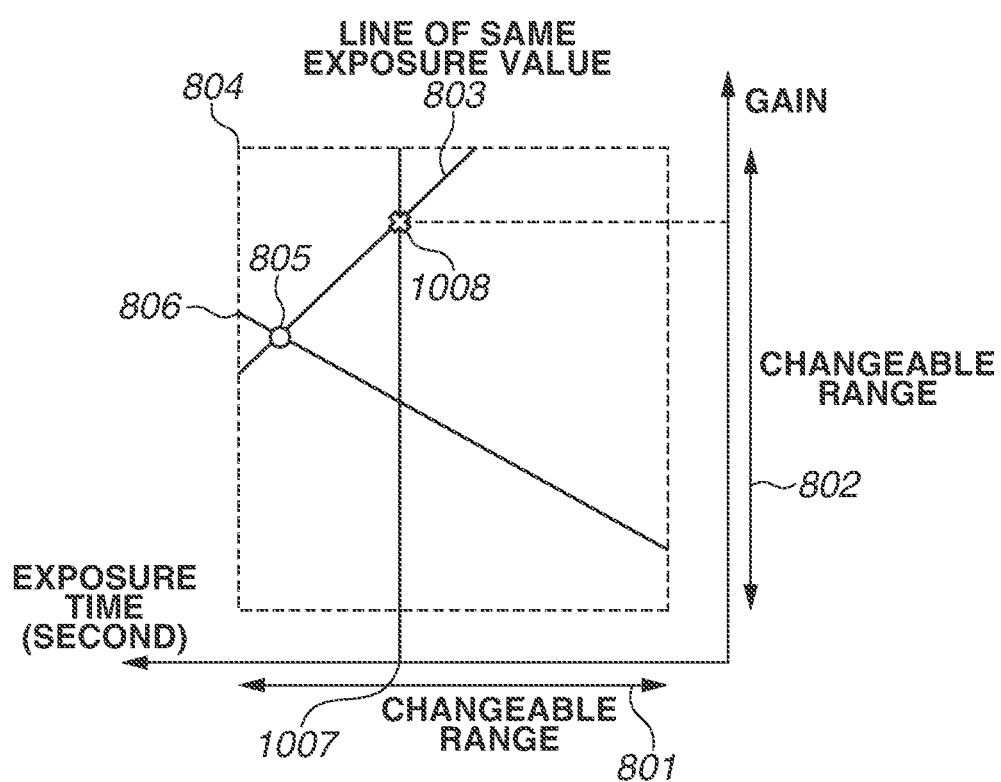
FIG. 10 is a diagram illustrating correction processing that reduces the exposure time under the same exposure conditions.

The exposure time correction processing in step S903 in FIG. 9 will be described with reference to a line graph illustrated in FIG. 10. The horizontal axis and the vertical axis in FIG. 10 represent the exposure time and the gain, respectively, and FIG. 10 illustrates the exposure time changeable range 801, the gain changeable range 802, the line 803, the line 806, the region 804, and the exposure conditions 805 similar to FIG. 8. Further, FIG. 10 also illustrates an exposure time upper limit value 1007. The condition determination unit 105 acquires the exposure time corresponding to the exposure conditions 805, which is the intersection point of the line 803 of the same exposure value and the line 806 defining the exposure conditions, by referring to the line graph in FIG. 10, and compares the exposure time with the exposure time upper limit value 1007. In the example in FIG. 10, the exposure time corresponding to the exposure conditions 805 exceeds the exposure time upper limit value 1007, and thus the condition determination unit 105 corrects the exposure conditions to a corrected point 1008, which is an intersection point of the line 803 of the same exposure value and the line of the exposure time upper limit value 1007. The exposure time and the value of the gain at the corrected point 1008 are exposure conditions corresponding to the exposure value.

<Gain Correction Processing>

Figure 11:
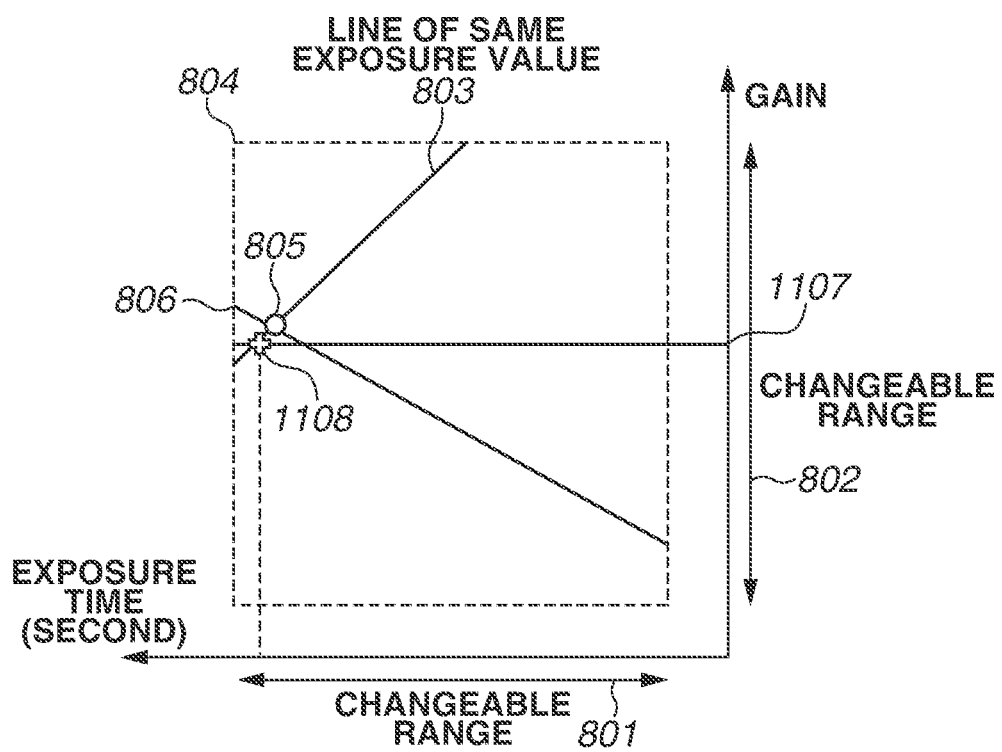
FIG. 11 is a diagram illustrating correction processing that reduces the gain under the same exposure conditions.

The gain correction processing in step S906 in FIG. 9 will be described with reference to a line graph illustrated in FIG. 11. The horizontal axis and the vertical axis in FIG. 11 represent the exposure time and the gain, respectively, and FIG. 11 illustrates the exposure time changeable range 801, the gain changeable range 802, the line 803, the line 806, the region 804, and the exposure conditions 805 similar to FIG. 8. Further, FIG. 11 also illustrates a gain upper limit value 1107. The condition determination unit 105 acquires the value of the gain corresponding to the exposure conditions 805, which is the intersection point of the line 803 of the same exposure value and the line 806 defining the exposure conditions, by referring to the line graph in FIG. 11, and compares the value of the gain with the gain upper limit value 1107. In the example in FIG. 11, the value of the gain corresponding to the exposure conditions 805 exceeds the gain upper limit value 1107, and thus the condition determination unit 105 corrects the exposure conditions to a corrected point 1108, which is an intersection point of the line 803 of the same exposure value and the line of the gain upper limit value 1107.

Figure 12:
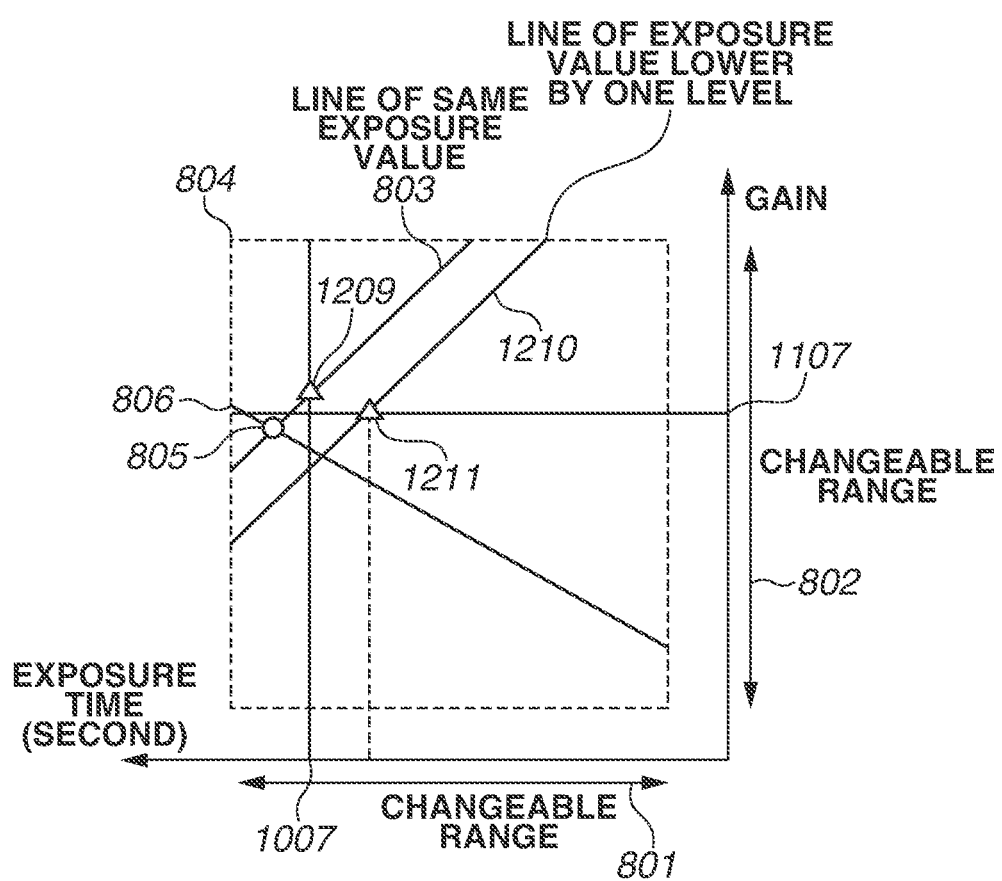
FIG. 12 is a diagram illustrating correction processing when a limitation is imposed on the exposure time and the gain.

FIG. 10 illustrates the example where the exposure time upper limit value is set, and FIG. 11 illustrates the example where the gain upper limit value is set. An example where both the exposure time upper limit value and the gain upper limit value are set will be described with reference to a line graph in FIG. 12. FIG. 12 illustrates processing in a case where the exposure conditions cannot be changed while keeping the same exposure value when both the exposure time upper limit value and the gain upper limit value are set. The horizontal axis and the vertical axis in FIG. 12 represent the exposure time and the gain, respectively, and FIG. 12 illustrates the exposure time changeable range 801, the gain changeable range 802, the line 803, the line 806, the region 804, and the exposure conditions 805 similar to FIG. 8. Further, FIG. 12 also illustrates the exposure time upper limit value 1007 and the gain upper limit value 1107.

The condition determination unit 105 acquires the exposure time corresponding to the exposure conditions 805, which is the intersection point of the line 803 of the same exposure value and the line 806 defining the exposure conditions, by referring to the line graph in FIG. 12, as described in the description of FIG. 10, and compares the exposure time with the exposure time upper limit value 1007. In the example in FIG. 12, the exposure time corresponding to the exposure conditions 805 exceeds the exposure time upper limit value 1007, and thus the condition determination unit 105 corrects the exposure conditions to a corrected exposure condition candidate 1209, which is an intersection point of the line 803 of the same exposure value and the line of the exposure time upper limit value 1007.

Then, the condition determination unit 105 compares the corrected exposure condition candidate 1209 with the gain upper limit value 1107. The corrected exposure condition candidate 1209 exceeds the gain upper limit value 1107 and thus the correction is performed in the example in FIG. 12, but exposure conditions exceeding neither the exposure time upper limit value 1007 nor the gain upper limit value 1107 are not present on the line 803 of the same exposure value. In this case, constraint conditions on the exposure time and the gain can be satisfied if the exposure value is lowered (i.e., the exposure value for each region that is calculated by the exposure value calculation unit 103 is updated) In the present exemplary embodiment, exposure conditions 1211, which is an intersection point of a line 1210 indicating a lower exposure value than the line 803 of the same exposure value by one level and the gain upper limit value 1107, are used as final corrected exposure conditions.

Figure 13:
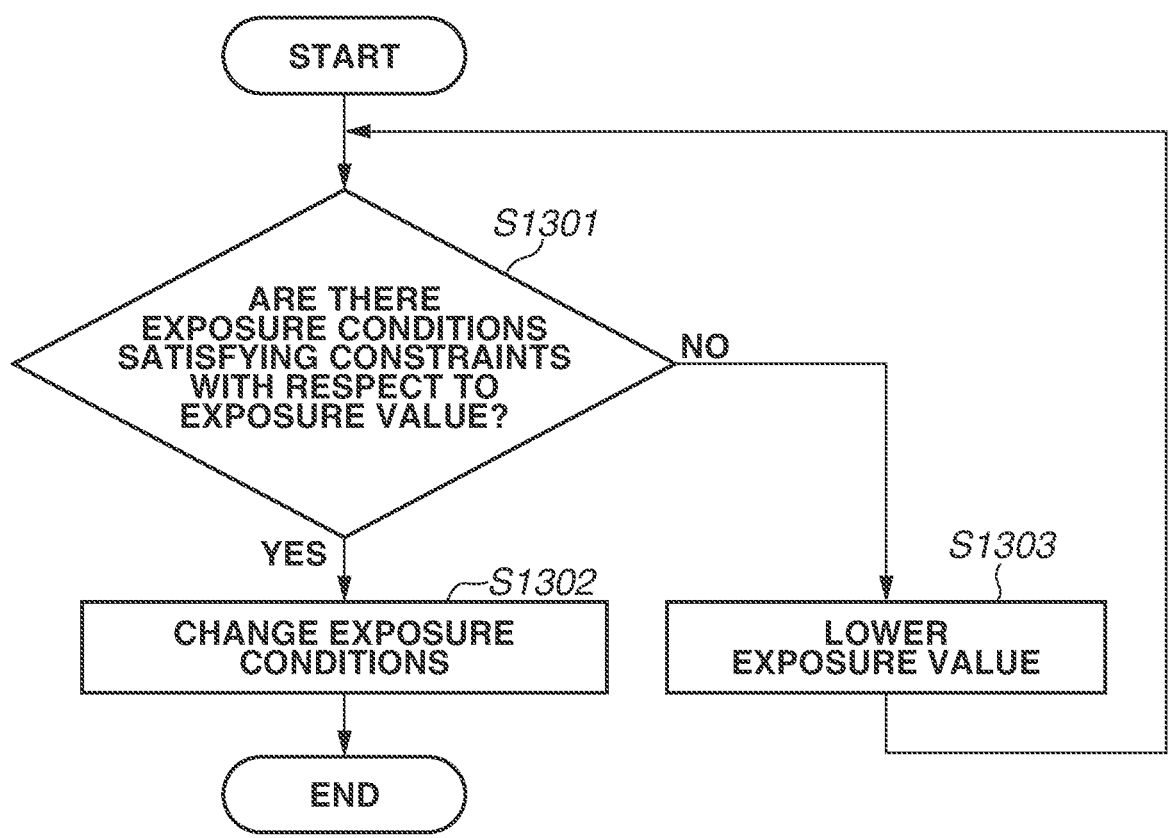
FIG. 13 is a flowchart illustrating processing in a case where there are no exposure conditions that satisfy the constraint conditions.

FIG. 13 is a detailed flowchart illustrating the processing in a case where there are no exposure conditions that satisfy the constraint conditions on the exposure time and the gain as described in the example in FIG. 12, in steps S903 and S906 in FIG. 9.

In step S1301, the condition determination unit 105 determines whether there are exposure conditions that satisfy the constraint conditions with respect to the exposure value in the processing region. In other words, the condition determination unit 105 determines whether the corrected exposure condition candidate 1209 in FIG. 12 satisfies constraints of the exposure time upper limit value 1007 and the gain upper limit value 1107. Then, if the condition determination unit 105 determines that the corrected exposure condition candidate 1209 satisfies the constraints (YES in step S1301), the processing proceeds to step S1302. In step S1302, the condition determination unit 105 changes the exposure conditions to the corrected exposure condition candidate 1209. Then, the processing is ended. On the other hand, if the condition determination unit 105 determines that the corrected exposure condition candidate 1209 does not satisfy the constraints (NO in step S1301), the processing proceeds to step S1303. In step S1303, the condition determination unit 105 lowers the exposure value by one level. In other words, the condition determination unit 105 changes the line graph used as the same exposure value from the line 803 to the line 1210. Subsequently, the processing returns to the determination processing in step S1301.

Regarding the correction processing in a case where there are no exposure conditions not exceeding the exposure time upper limit value and the gain upper limit value, the present exemplary embodiment is not limited to the processing that lowers the exposure value as described above. For example, the imaging apparatus 101 may be configured to not perform the correction processing on any one of them when there are no exposure conditions not exceeding the exposure time upper limit value and the gain upper limit value. Alternatively, the imaging apparatus 101 may perform processing that does not perform the correction processing on any one or both of them (uses the same exposure conditions) by changing the aperture value of the imaging processing unit 102.

In the above-described manner, in the present exemplary embodiment, setting the upper limit value on the exposure time allows the imaging apparatus 101 to prevent or reduce a motion blur in the motion region, thereby improving visibility of the captured image. Further, in the present exemplary embodiment, setting the upper limit value on the value of the gain allows the imaging apparatus 101 to curb or reduce the influence of noise, thereby improving the compression ratio of a captured image. Further, in the present exemplary embodiment, adjusting the upper limit values on the exposure time and the gain allows the imaging apparatus 101 to achieve the improvement of the visibility and the improvement of the compression ratio depending on the intended use.

For example, in a case where the dynamic range of the captured image is expanded by capturing an image with the exposure amount changed for each region and combining such images, in the present exemplary embodiment, the imaging apparatus 101 determines a region including a motion and changes the exposure conditions for each region including a motion depending on the intended use. As a result, in the present exemplary embodiment, the imaging apparatus 101 can prevent or reduce the occurrence of a motion blur in a subject in motion at a dark portion and reduce noise in the captured image depending on the purpose such as prioritizing the visibility or prioritizing the compression ratio.

The first exemplary embodiment has been described regarding the method for correcting the exposure conditions based on the line graph. A second exemplary embodiment will be described regarding a method for correcting the exposure conditions by switching between tables for deriving the exposure conditions from the exposure value depending on the intended use, without using the line graph.

Figure 14:
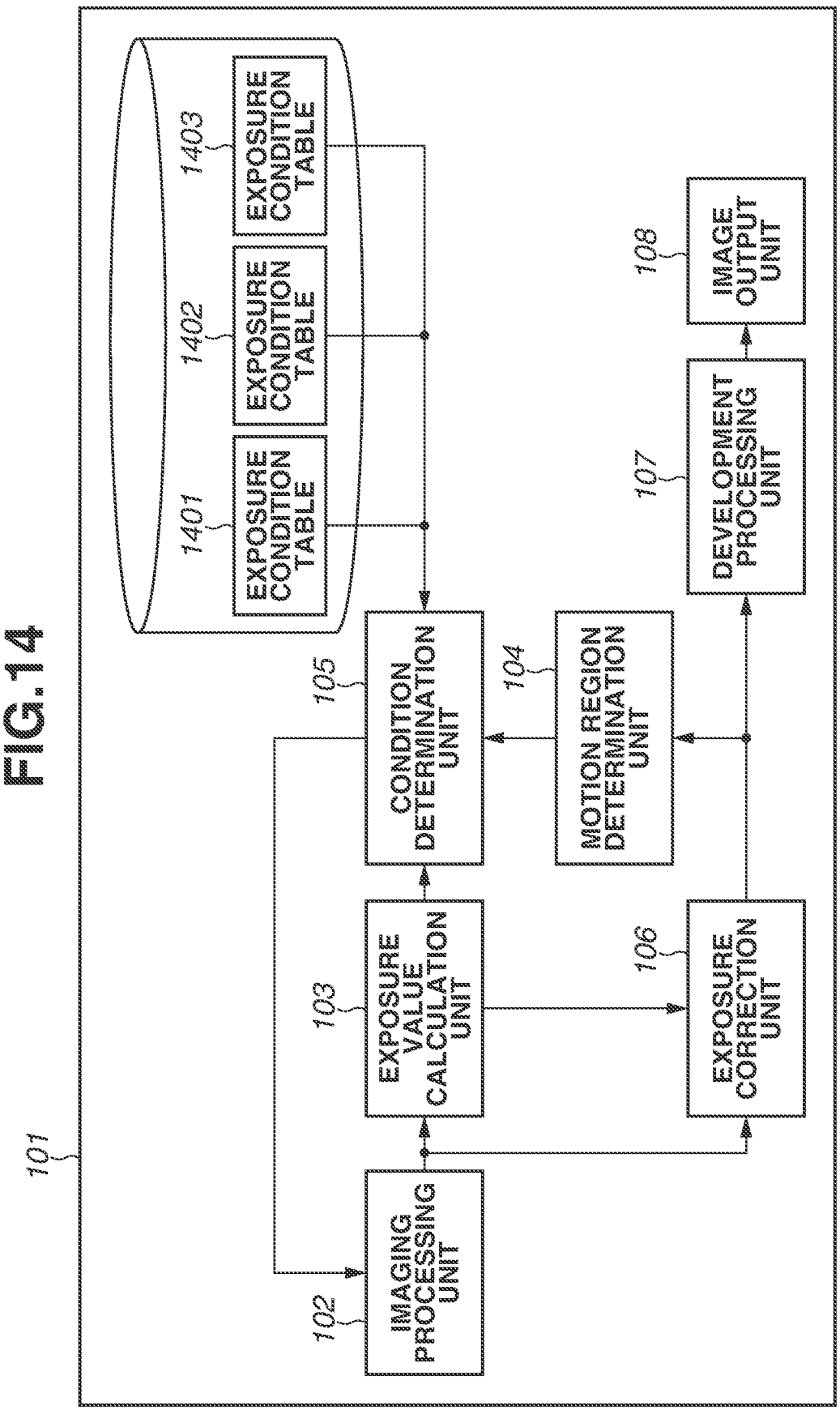
FIG. 14 is a diagram illustrating an example of a configuration of an imaging apparatus according to a second exemplary embodiment.

FIG. 14 is a diagram illustrating an example of a configuration of an imaging apparatus according to the second exemplary embodiment.

In an imaging apparatus 101 according to the second exemplary embodiment, the imaging processing unit 102, the exposure value calculation unit 103, the motion region determination unit 104, the exposure correction unit 106, the development processing unit 107, and the image output unit 108 perform similar processing as the processing performed by corresponding units in the first exemplary embodiment (FIG. 1), and thus descriptions thereof will be omitted herein. Overall processing procedures by the imaging apparatus 101 according to the second exemplary embodiment is similar to the overall processing procedures according to the first exemplary embodiment in FIG. 2, and thus a description thereof will be omitted herein. Further, region-by-region exposure value calculation processing and motion region determination processing are also similar to those according to the first exemplary embodiment, and thus descriptions thereof will be omitted herein.

A condition determination unit 105 according to the second exemplary embodiment updates the settings of the imaging processing unit 102 by selecting from tables defining the region-by-region exposure conditions based on the exposure value for each region that is acquired from the exposure value calculation unit 103 and the information regarding whether there is a motion for each region that is acquired from the motion region determination unit 104. In the present exemplary embodiment, an exposure condition table 1401, an exposure condition table 1402, and an exposure condition table 1403 are prepared as the tables defining the region-by-region exposure conditions. Exposure conditions A indicating a relationship between the exposure value and the exposure conditions are defined in the exposure condition table 1401, and, similarly, exposure conditions B and exposure conditions C are defined in the exposure condition table 1402 and the exposure condition table 1403, respectively. The condition determination unit 105 selects one of the exposure conditions A to C by selecting one of the exposure condition tables 1401 to 1403.

The region-by-region exposure value calculation processing according to the second exemplary embodiment will be described below.

FIG. 15 is a diagram illustrating an example of an exposure condition table in which a combination of the exposure time and the gain corresponding to the exposure value is written. In FIG. 15, three kinds of exposure condition settings, namely the exposure conditions A (the exposure condition table 1401), the exposure conditions B (the exposure condition table 1402), and the exposure conditions C (the exposure condition table 1403) are written. In the present exemplary embodiment, the exposure conditions A are settings prioritizing the visibility for the motion region (a region including an object in motion), and are exposure conditions in which the exposure time is reduced when the exposure value is low (dark). The exposure conditions B are settings prioritizing the compression ratio for the motion region, and are exposure conditions in which the exposure time is reduced while the value of the gain is limited to up to 16, for example, when the exposure value is low (dark). The exposure conditions C are settings for a static region. In the present exemplary embodiment, the user is to select in advance either the visibility priority mode, which is a first exposure condition mode, or the compression ratio priority mode, which is a second exposure condition mode, as the exposure conditions for the motion region. For example, if the visibility priority mode is selected, the exposure conditions A (exposure condition table 1401) is selected in the motion region. On the other hand, if the compression ratio priority mode is selected, the exposure conditions B (the exposure condition table 1402) is selected in the motion region.

Figure 16:
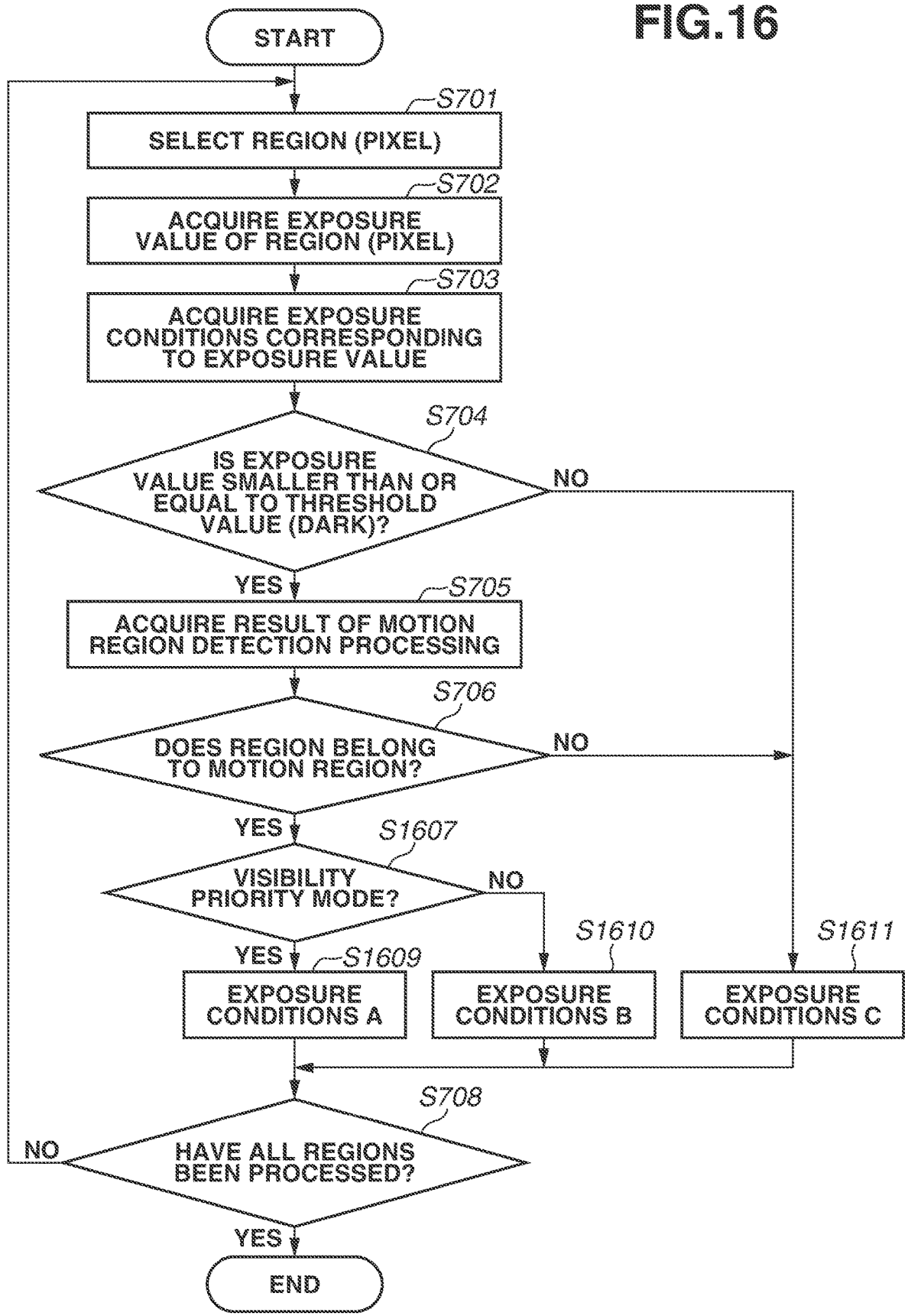
FIG. 16 is a flowchart illustrating exposure condition determination processing according to the second exemplary embodiment.

FIG. 16 is a flowchart illustrating processing procedures by the condition determination unit 105 according to the second exemplary embodiment. The processing procedures of steps S701 to S704 and S708 are similar to the respective processing procedures indicated by the same reference numerals in FIG. 7 according to the first exemplary embodiment. Thus, descriptions thereof will be omitted herein.

In the second exemplary embodiment, if the condition determination unit 105 determines that the exposure value is smaller than or equal to the threshold value as a result of the determination in step S704 (YES in step S704), the processing proceeds to step S705. If the exposure value is not smaller than or equal to the threshold value (NO in step S704), the processing proceeds to step S1611. The processing procedures of steps S705 and S706 are similar to the respective processing procedures indicated by the same reference numerals in FIG. 7 according to the first exemplary embodiment. Thus, descriptions thereof will be omitted herein.

In the case of the second exemplary embodiment, if the condition determination unit 105 determines that the processing region belongs to a motion region as a result of the determination in step S706 (YES in step S706), the processing proceeds to the processing of step S1607. If the condition determination unit 105 determines that the processing region does not belong to a motion region (NO in step S706), the processing proceeds to the processing of step S1611.

In step S1607, the condition determination unit 105 checks the preset exposure condition mode of the motion region. If the condition determination unit 105 determines that the exposure condition mode is the visibility priority mode (YES in step S1607), the processing proceeds to step S1609. If the condition determination unit 105 determines that the exposure condition mode is the compression ratio priority mode (NO in step 1607), the processing proceeds to step S1610.

In step S1609, the condition determination unit 105 selects the exposure conditions A (exposure condition table 1401), and identifies the exposure conditions corresponding to the exposure value of the region by referring to the table. Then, the processing proceeds to step S708.

In step S1610, the condition determination unit 105 selects the exposure conditions B (exposure condition table 1402), and identifies the exposure conditions corresponding to the exposure value of the region by referring to the table. Then, the processing proceeds to step S708.

In step S1611, the condition determination unit 105 selects the exposure conditions C (exposure condition table 1403), and identifies the exposure conditions corresponding to the exposure value of the region by referring to the table. Then, the processing proceeds to step S708.

In the above-described manner, in the second exemplary embodiment, the imaging apparatus 101 can prevent or reduce a motion blur in the motion region to improve the visibility of the captured image by applying the exposure conditions under which the exposure time is reduced to the motion region in the visibility priority mode. Further, in the second exemplary embodiment, the imaging apparatus 101 becomes able to curb or reduce the influence of noise to improve the compression ratio of the captured image by applying the exposure conditions under which the exposure time is reduced without the value of the gain excessively increased to the motion region in the compression ratio priority mode.

The motion region is determined and the exposure condition determination processing is performed region by region for each processing region in the above-described exemplary embodiments, but the exposure condition determination processing is not limited thereto. For example, the processing may be applied to an important region such as the central portion of the screen based on externally configured settings, a result of image recognition processing, or the like. Alternatively, the processing may be applied after the upper limit values on the adjustment ranges of the exposure time and the gain and the exposure condition table are changed for each region based on externally configured settings, a result of image recognition processing, or the like.

Further, the motion region determination processing has been described as being performed by evaluating the luminance difference for each region based on two captured images acquired at different imaging times in the above-described exemplary embodiments, but is not limited thereto. For example, the motion region determination processing may be performed using three or more captured images, or may search for a motion by calculating a sum of absolute differences (SAD) of pixels between the captured images. Alternatively, the motion region determination processing may be performed by acquiring an optical flow of the captured image and using it to determine the motion region.

As the limitation in the exposure condition correction processing, the upper limit values are set on the adjustment ranges of the exposure time and the gain in the first exemplary embodiment, but the limitation is not limited thereto. The limitation may be imposed on one of the exposure time and the gain value, or a lower limit value may be added to the limitation, depending on the purpose.

The disclosure can also be embodied by processing that supplies a program that implements one or more functions of the above-described exemplary embodiments to a system or an apparatus via a network or a storage medium, and causes one or more processors in a computer of the system or the apparatus to read and execute the program. Further, the disclosure can also be embodied by a circuit (for example, an application specific integrated circuit (ASIC)) that implements one or more functions.

Any of the above-described exemplary embodiments merely indicates an example of how to embody the disclosure when implementing the disclosure, and the technical scope of the disclosure shall not be construed limitedly by them.

In other words, the disclosure can be implemented in various manners without departing from the technical idea thereof or the main features thereof.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-198252, filed Nov. 30, 2020, which is hereby incorporated by reference herein in its entirety.

What is claimed is:

1. An apparatus configured to divide a captured image into a plurality of regions and carry out imaging under a different exposure condition for each of the regions, the apparatus comprising:
   at least one processor; and
   a memory coupled to the at least processor storing instructions that, when executed by the processor, cause the processor to function as:
   an acquisition unit configured to acquire an exposure value for each of the regions in the captured image;
   a detection unit configured to detect a motion region based on the captured image; and
   a determination unit configured to determine an exposure time and a gain based on the exposure value for each of the regions and a result of detection of the motion region,
   wherein the determination unit sets an upper limit value on an adjustment range of the gain based on the result, and
   in a case where the gain corresponding to the acquired exposure value exceeds the upper limit value on the gain, the determination unit corrects the gain to the upper limit value or less.

2. The apparatus according to claim 1, wherein the limitation is an upper limit value on the adjustment range of the exposure time.

3. The apparatus according to claim 2, wherein, in a case where the exposure time corresponding to the acquired exposure value exceeds the upper limit value on the exposure time, the determination unit corrects the exposure time to the upper limit value or less.

4. The apparatus according to claim 3, wherein the determination unit makes a correction while preventing the exposure condition from deviating from a line graph indicating a relationship of a combination of the exposure time and the gain corresponding to a same exposure value.

5. The apparatus according to claim 4, wherein, in a case where correcting the exposure time to the upper limit value or less causes the exposure condition to deviate from the line graph indicating the relationship of the combination of the exposure time and the gain corresponding to the same exposure value, the determination unit makes the correction on a line graph indicating the relationship of the combination of the exposure time and the gain corresponding to a same exposure value lower than the same exposure value by one level.

6. The apparatus according to claim 1,
wherein the determination unit includes a first mode and a second mode, and
wherein a difference is made in the adjustment range of at least any of the exposure time and the gain between the first mode and the second mode as the limitation.

7. The apparatus according to claim 6,
wherein the determination unit includes tables each defining a combination of the exposure time and the gain corresponding to the exposure value, the tables corresponding to the first mode and the second mode, respectively, and
wherein the tables are switched based on the result.

8. The apparatus according to claim 1, wherein the detection unit detects whether there is a motion for each of the regions based on information about a luminance for each of the regions.

9. A method for controlling an apparatus configured to divide a captured image into a plurality of regions and carry out imaging under a different exposure condition for each of the regions, the method comprising:
acquiring an exposure value for each of the regions;
detecting a motion region based on the captured image; and
determining an exposure time and a gain based on the exposure value for each of the regions and a result of detection of the motion region,
wherein the determining includes setting an upper limit value on an adjustment range of the gain based on the result, and
in a case where the gain corresponding to the acquired exposure value exceeds the upper limit value on the gain, the determination unit corrects the gain to the upper limit value or less.

10. The method according to claim 9, wherein the limitation is an upper limit value on the adjustment range of the exposure time.

11. The method according to claim 9,
wherein the determining includes a first mode and a second mode, and
wherein a difference is made in the adjustment range of at least any of the exposure time and the gain between the first mode and the second mode as the limitation.

12. The method according to claim 9, wherein the detecting detects whether there is a motion for each of the regions based on information about a luminance for each of the regions.

13. A non-transitory storage medium storing a program causing an apparatus configured to divide a captured image into a plurality of regions and carry out imaging under a different exposure condition for each of the regions to execute a method for controlling the apparatus, the method comprising:
acquiring an exposure value for each of the regions;
detecting a motion region based on the captured image; and
determining an exposure time and a gain based on the exposure value for each of the regions and a result of detection of the motion region,
wherein the determining includes setting an upper limit value on an adjustment range of the gain based on the result, and
in a case where the gain corresponding to the acquired exposure value exceeds the upper limit value on the gain, the determination unit corrects the gain to the upper limit value or less.

14. The non-transitory storage medium according to claim 13, wherein the limitation is an upper limit value on the adjustment range of the exposure time.

15. The non-transitory storage medium according to claim 13,
wherein the determining determines a first mode and a second mode, and
wherein a difference is made in the adjustment range of at least any of the exposure time and the gain between the first mode and the second mode as the limitation.

16. The non-transitory storage medium according to claim 13, wherein the detecting detects whether there is a motion for each of the regions based on information about a luminance for each of the regions.

* * * * *